Figure 2:
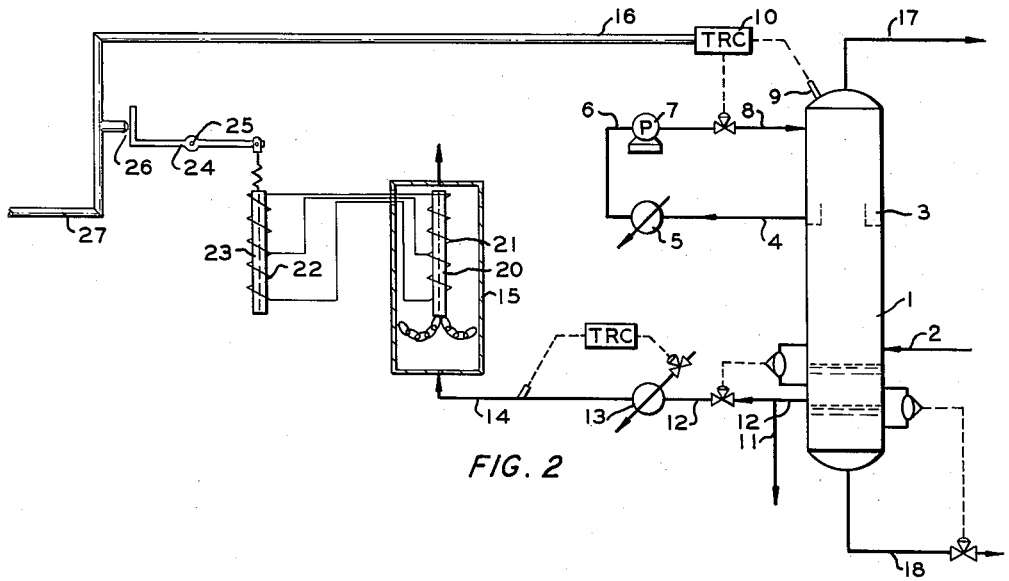
Figure 1:
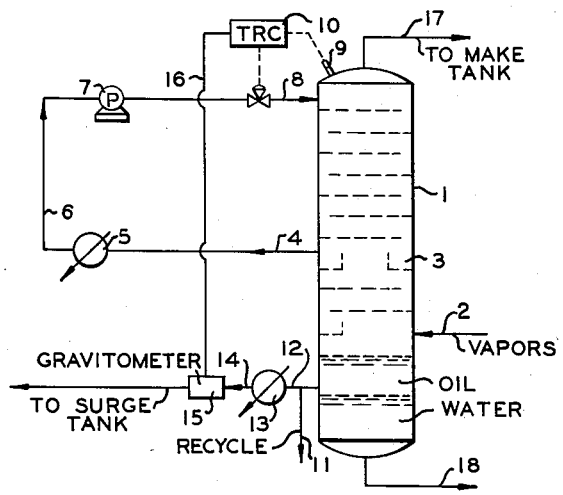

June 27, 1961
R. H. STONE
2,990,366
METHOD FOR CONTROL OF DEPHLEGMATOR IN RESPONSE TO
SPECIFIC GRAVITY MEASUREMENTS
Filed Oct. 21, 1957

INVENTOR.
R.H. STONE

BY *Hudson and Young*

ATTORNEYS

United States Patent Office 2,990,366
Patented June 27, 1961

2,990,366
METHOD FOR CONTROL OF DEPHLEGMATOR IN RESPONSE TO SPECIFIC GRAVITY MEASUREMENTS
Royal H. Stone, Bartlesville, Okla., assignor to Phillips Petroleum Company, a corporation of Delaware
Filed Oct. 21, 1957, Ser. No. 691,182
2 Claims. (Cl. 208—341)

This invention relates to a method and an apparatus for the control of a dephlegmator. In one of its aspects, the invention relates to a method and apparatus for control of dephlegmator tower top temperature by detecting the gravity of its kettle product and modifying or resetting a tower top temperature controller which controls the rate of liquid to the tower top responsive to change detected in said gravity. In another of its aspects, the invention relates to a method and an apparatus for more efficiently removing natural gasoline from an absorber oil which has been used to absorb said natural gasoline during a recovery operation for this purpose, the said method and apparatus providing steps and means for removing, from the bottom of a dephlegmator used to dephlegmate absorber oil from gasoline vapors which have been liberated from the enriched oil, a portion of the kettle product, cooling the kettle product to a constant predetermined temperature, detecting the gravity of the kettle product and responsive to change in said kettle product resetting the dephlegmator tower top temperature controller means.

It is known in the art to use dephlegmators to condense lean oil from natural gasoline which has been stripped from rich oil. It is now important that the amount of gasoline condensed in the lean oil removed from the dephlegmator bottom and passed back to the stripper be controlled as accurately as possible. This is so because, if the top temperature of the dephlegmator exceeds the optimum temperature, lean oil is carried overhead with the gasoline vapors. Also, if the temperature at the top of the tower becomes too low, the lean oil removed from the bottom of the dephlegmator and passed back into the top of the stripper will contain a high concentration of natural gasoline and this will decrease the throughput of the stripper.

It is an object of this invention to provide a method and means for controlling a dephlegmator. It is another object of this invention to provide method and means for efficiently recovering natural gasoline from a rich absorber oil containing the same. It is a further object of this invention to provide method and means for operating a dephlegmator tower in which vapors of one material are being separated from another which might be entrained by said vapors or which may be removed as bottoms from said dephlegmator, taking with it an undesirable amount of dissolved vapors.

Other aspects, objects and the several advantages of this invention are apparent from a study of this disclosure, the drawing and the appended claims.

According to the present invention, there are provided method and means for controlling a dephlegmator tower top temperature responsive to the gravity of a kettle product being produced in said dephlegmator. More specifically, according to the invention, there are provided method and means for modifying the operation of the temperature controller zone which acts to control the temperature at the top of a dephlegmator tower responsive to the gravity of a kettle product removed from said dephlegmator tower, the said gravity being measured at a constant predetermined temperature to which said kettle product is adjusted.

It is now preferred to remove the kettle product or bottoms from the dephlegmator and to cool the same to a predetermined temperature, say, in the range of approximately 70–100° F., preferably 75–85° F., before measuring or detecting gravity. While a cooling of the kettle bottoms is now preferred in connection with the recovery of natural gasoline from absorber oil from which it has been stripped, in connection with which this invention will be described, it will be clear to one skilled in the art in possession of this disclosure that the temperature to which the kettle product or bottoms can be adjusted can vary considerably, depending upon the particular composition of the materials within the dephlegmator or fractionating tower.

In the drawings, in FIGURE I there is show diagrammatically a specific embodiment of this invention. In FIGURE II details of a gravitometer-controller and associated equipment are shown.

In FIGURE I of the drawings, 1 is a dephlegmator tower to which vapors from a gasoline stripper still are fed by way of pipe 2. The vapors will contain largely gasoline, hydrocarbons, some steam and some absorption medium or oil. The composition of the stream entering by way of pipe 2 will vary and as this composition varies maintaining of the tower top temperature constant will result in either some loss of absorption medium by way of the overhead vapors taken from the tower or the return of an unduly rich lean oil to the stripper still which will reduce the efficiency of the said still. Thus, in operation, liquid is taken from tray 3 and passed by way of pipe 4, air cooler 5, pipe 6, pump 7 and valve pipe 8 to the tower top. The flow of this stream is controlled by detecting the tower top temperature with thermocouple 9 and adjusting the valve in pipe 8 by means of temperature controller recorder 10. According to the invention, some of the oil in the kettle of the dephlegmator, which ordinarily would be recycled by way of pipe 11 to the stripper still, is passed by way of pipe 12, cooler 13, pipe 14 into gravitometer 15. In gravitometer 15, the gravity of the oil, the temperature of which has been adjusted in the specific embodiment being described to 80° F., is detected and a change is made in the setting of temperature controller recorder 10 which is in line with any change of gravity which has been detected in gravitometer 15. The change is made by relaying a signal from gravitometer 15 to temperature controller recorder 10 by way of reset control line 16. By operation, as just described, with apparatus as just describe, there is removed by way of overhead vapor line 17 substantially pure gasoline or at least a gasoline containing substantially no entrained absorber oil. Also, the composition of the oil recycled by way of pipe 11 is automatically maintained as desired. Thus, according to the operation just described, the gravitometer automatically maintains the proper recycle oil composition, as well as the desired overhead gasoline composition, by automatically resetting the top temperature control to increase the temperature when the gravity of the absorption medium decreases, due to increased gasoline therein, and vice versa. Any excess water is withdrawn from tower 1 by way of pipe 18.

Referring now to FIGURE II, gasoline vapors from a still, not shown, enter dephlegmator 1 through pipe 2. A pnematically reset temperature recorder controller 10 controls the overhead temperature of the dephlegmator. Water is withdrawn from the dephlegmator through pipe 18 and water is also withdrawn from the dephlegmator through pipe 4, cooled in heat exchanger 5 and returned to the column as reflux by way of pipe 6, pump 7 and pipe 8. The condensed hydrocarbons pass from the dephlegmator through pipe 12 and most of these pass through pipe 11 and back to the still. The remainder of the condensed hydrocarbons pass through pipe 12, heat exchanger 13, and pipe 14 to gravitometer-controller 15. In gravitometer-controller 15 the temperature of the hydrocarbons, in the instance being described, is maintained at 100° F. by means not shown and an inductance bridge system is employed in which a magnetic armature 20 in gravitometer-controller 15 rises and falls with changes in gravity of the liquid flowing through the gravitometer-controller. The coil of wire 21 which surrounds armature 20 is identical to coil 22 which surrounds armature 23. Movement of armature 20 causes a magnetic force to act upon armature 23 in coil 22 until armature 23 assumes a position similar to that of armature 20. Through counterbalance rocker arm 24 pivoted at 25, the movement of armature 20 moves counterbalance arm 24 from or towards orifice 26. A supply of air at 15 pounds per square inch gage flows through pipe 27. Air pressure in pipe 16 is controlled by the amount of air bled through orifice 26. The air pressure in pipe 27 is exerted against the diaphragm, not shown, of pneumatically operated temperature recorder controller 10. The equipment is operated to maintain the gravity of the oil removed from column 2. If the gravity of the oil flowing through gravitometer-controller 15 becomes greater than that of a predetermined value, the two armatures will rise, the rocker arm will be moved against the orifice and pressure against the diaphragm in temperature recorder controller 10 is increased. This causes the set point in temperature recorder controller 10 to be decreased which causes temperature recorder controller 10 to maintain a constant lower temperature in the top of the dephlegmator until a further change is detected in the gravitometer-controller 15.

Although the invention has been described in connection with a now preferred form, namely, that in which gasoline vapors containing some absorber oil or medium are separated from said oil or medium, it will be obvious to one skilled in the art in possession of this disclosure that the invention, being one of a physical character, it will have other applications.

*Specific example*

The following are data exemplary of the operation according to the invention. The numbers correspond to those in the drawings.

| | | |
|---|---|---|
| 2 | Vapors to dephlegmator | 400° F.—260 p.s.i.a.; 12 mm. s.c.f.d. gasoline containing hydrocarbons; 11,185 mols H₂O/day. |
| 12 | Oil from dephlegmator kettle | 280° F.—75–100 g.p.m. |
| 4 | Water reflux | Out 250° F. |
| 8 | Water reflux | In 130–150° F.—9,000 g.p.h. |
| 1 | Dephlegmator | Top 140–180° F.—260 abs. |
| 17 | Overhead vapors | 11.6 mm. s.c.f.d. hydrocarbons; 609 mols H₂O/day. |
| 15 | Density of condensed hydrocarbons | 47.3 API when cooled to 60° F. and 51 API at 100° F. (.775 sp. gr. at 100° F.). |

Reasonable variation and modification are possible within the scope of the foregoing disclosure, drawing and the appended claims to the invention, the essence of which is that method and means have been provided for automatically resetting a tower top temperature control operation responsive to changes of gravity in its kettle product.

I claim:

1. In the recovery of natural gasoline from an absorber oil or medium, which has been used to absorb said gasoline and is enriched with said gasoline wherein the rich oil is stripped of its gasoline content in a stripping zone, passing vapors thus obtained which contain gasoline and some of said oil to a dephlegmation zone heated only by said vapors and there subjecting said vapors to dephlegmation to separate a gasoline vapor overhead from a lean oil bottoms product, supplying to the top of said dephlegmation zone a stream of liquid to cool said zone, removing at least a portion of said liquid from said dephlegmation zone at a point intermediate between top and bottom of said zone, cooling and returning said portion to the top of said dephlegmation zone, measuring the dephlegmation zone top temperature, controlling said top temperature by controlling the rate of flow of said liquid supplied to the top of said dephlegmation zone responsive to said measured top temperature, removing a portion of said lean oil bottoms product from said dephlegmation zone and passing said portion of said lean oil to a specific gravity measuring zone, controlling the temperature of said portion of lean oil in said specific gravity measuring zone to a constant predetermined value, sensing the specific gravity of said portion of lean oil in said specific gravity sensing zone, transmitting a signal corresponding to said sensed specific gravity to modify the control of said liquid responsive to change in said specific gravity so as to increase said top temperature when the gravity of said lean oil decreases and vice versa to maintain said gravity at a predetermined value, thereby removing from said vapors a maximum portion of said gasoline and recovering a lean oil absorber medium having maximum capacity for recovering additional absorbable vapors and increasing the efficiency of a vapor recovery system using said lean oil medium.

2. In the recovery of natural gasoline from an absorber oil or medium, which has been used to absorb said gasoline and is enriched with said gasoline wherein the rich oil is stripped of its gasoline content in a stripping zone, passing vapors thus obtained which contain gasoline and some of said oil to a dephlegmation zone heated only by said vapors and there subjecting said vapors to dephlegmation to separate a gasoline vapor overhead from a lean oil bottoms product, supplying to the top of said dephlegmation zone a stream of water to cool said zone, removing at least a portion of said water from said dephlegmation zone at a point intermediate between top and bottom of said zone, cooling and returning said portion to the top of said dephlegmation zone, measuring the dephlegmation zone top temperature, controlling said top temperature by controlling the rate of flow of said water supplied to the top of said dephlegmation zone responsive to said measured top temperature, removing a portion of said lean oil bottoms product from said dephlegmation zone and passing said portion of said lean oil to a specific gravity measuring zone, controlling the temperature of said portion of lean oil in said specific gravity measuring zone to a constant predetermined value, sensing the specific gravity of said portion of lean oil in said specific gravity sensing zone, transmitting a signal corresponding to said sensed specific gravity to modify the control of said water responsive to change in said specific gravity so as to increase said top temperature when the gravity of said lean oil decreases and vice versa to maintain said gravity at a predetermined value, thereby removing from said vapors a maximum portion of said gasoline and recovering a lean oil absorber medium having maximum capacity for recovering additional absorbable vapors and increasing the efficiency of a vapor recovery system using said lean oil medium.

References Cited in the file of this patent

UNITED STATES PATENTS

| | | |
|---|---|---|
| 1,743,568 | Price | Jan. 14, 1930 |
| 2,357,113 | Houghland et al. | Aug. 29, 1944 |
| 2,445,255 | Younkin | June 13, 1948 |
| 2,453,205 | Docksey | Nov. 9, 1948 |
| 2,529,030 | Latchum | Nov. 7, 1950 |
| 2,710,278 | Gilmore | June 7, 1955 |

OTHER REFERENCES

Harts: Oil and Gas Journal, October 29, 1942, pages 59–62, 64 and 65. Page 60 only needed.

Camp et al.: Chemical Engineering (September 1950), pp. 108–111 (pages 108 and 109 only needed).